UNITED STATES PATENT OFFICE.

CHRISTIAN C. ANSTAETT, OF ELGIN, ILLINOIS.

BREAD.

SPECIFICATION forming part of Letters Patent No. 678,454, dated July 16, 1901.

Application filed April 13, 1899. Renewed November 23, 1900. Serial No. 37,459. (No specimens.)

*To all whom it may concern:*

Be it known that I, CHRISTIAN C. ANSTAETT, a resident of Elgin, in the county of Kane and State of Illinois, have invented certain new and useful Improvements in Bread, of which the following is a specification.

My invention relates to a bread made according to a novel recipe, and is designed to produce a bread that shall be nutritious, wholesome, and easily digested and that at the same time can be made at a slight expense of labor, materials, and time.

The bread made according to my new process retains its freshness for many days, the moisture remaining in it very much longer than in ordinary bread, and it does not readily mold or otherwise become unfit for use.

In carrying out my invention I first take one and one-half pounds of the best corn-flour—*i. e.*, flour made from maize or Indian corn and ground as fine and clean as wheat-flour—and add to this three quarts of boiling water, stirring the mixture until all the flour is scalded, thereby producing a mass of dough or paste of uniform consistency weighing a little over seven pounds. To this I add a pint of lukewarm water into which I have crumbled two ounces of bakers' compressed yeast and two ounces of salt stirred thoroughly, so as to dissolve the salt and yeast as much as possible. Two ounces each of pure lard and malt extract, together with five pounds of the best patent wheat-flour, finally added complete the ingredients, which are thoroughly worked and kneaded and allowed to rise in the kneading-trough at the ordinary temperature, the time required for which is ordinarily three or four hours. The time at which the rising is completed can be readily ascertained by depressing the dough at any point. If the depression is immediately filled up, the rising is not completed, as the depression is permanent when it is completed. The dough is then divided into sixteen parts (the total weight being about seventeen pounds) and put into the baking-pans, when it is allowed to stand for, say, half an hour before it is put in the oven to bake, which operation consumes from thirty to forty minutes. The resulting bread is light and spongy and contains a larger percentage of moisture than ordinary bread, and the moisture does not evaporate readily, so that it keeps fresh longer than ordinary bread. It is very nutritious and can be easily digested even by dyspeptics when it is just baked. It will also be observed that owing to the lesser cost of the corn-flour the materials are cheaper than of a bread made of wheat-flour alone, while it is more nutritious and fully as palatable. There is also a marked saving of time and labor in its manufacture in comparison with the ordinary modes of bread-making, owing to dispensing with the preparing and raising of sponge, which is subsequently incorporated into the main portion of the flour and other materials, which in turn must be raised. Not only is two or three hours' time saved, but the amount of manipulation is reduced, and a baker can prepare and bake about fifty per cent. more bread in a day by my new process than by the old ones. As a consequence of the saving of time, materials, and labor I am enabled to manufacture bread by my process at a cost of from three-quarters to one cent a pound loaf as compared with one and three-quarters to two cents for a pound loaf of ordinary bakers' bread.

I do not herein claim the process of manufacture of this bread, as I claim that in my application, Serial No. 37,460, filed November 23, 1900, the patent for which I propose to have issued simultaneously herewith.

While I have described the exact mode, materials, and proportions which I at present consider best adapted to carry out my invention, it will be understood that it is capable of some modications and that I do not desire to be limited in the interpretation of the following claims only as may be necessitated by the state of the art.

What I claim as new, and desire to secure by Letters Patent of the United States, is—

1. As a new article of manufacture, the bread made of corn-flour, wheat-flour, water, salt and yeast in the manner and in substantially the proportions specified, to wit: one and one-half pounds corn-flour; five pounds wheat-flour; three and one-half quarts of water; and two ounces each of salt and yeast.

2. As a new article of manufacture, the bread made of corn-flour, wheat-flour, water, salt, yeast, lard, and malt, in the manner and in substantially the proportions specified, to wit: one and one-half pounds corn-flour; five pounds wheat-flour; three and one-half quarts of water; and two ounces each of salt, yeast, lard, and malt extract.

CHRISTIAN C. ANSTAETT.

Witnesses:
   EDWARD B. ESHER,
   AUGUST SCHEELE.